March 1, 1955     W. S. FREDERIK     2,702,950
APPARATUS FOR TESTING TIME INTERVALS
Filed April 12, 1952     6 Sheets-Sheet 4

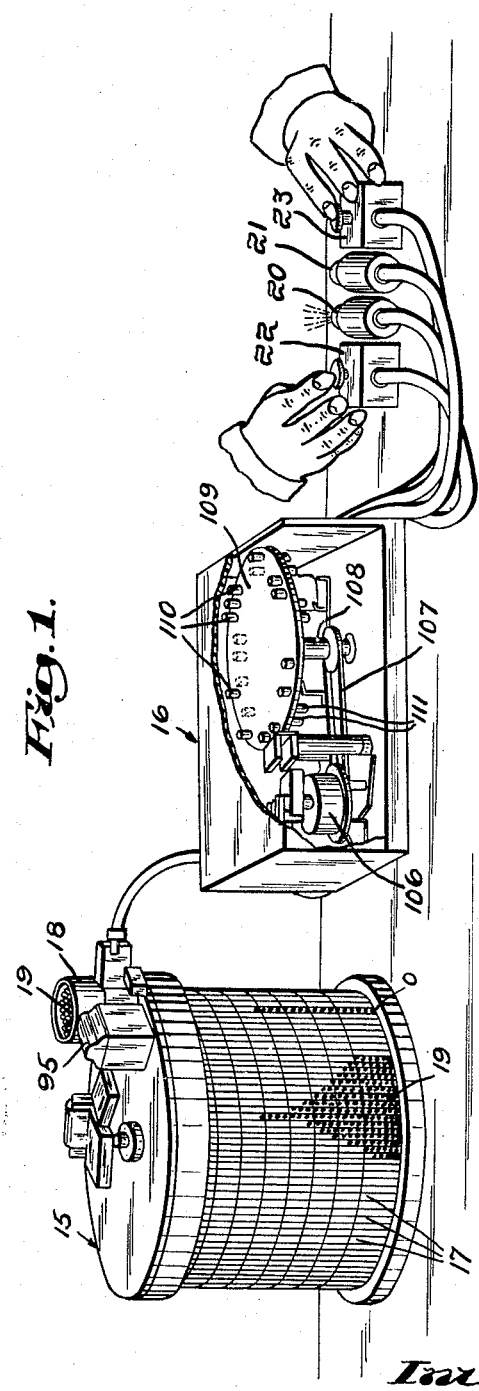

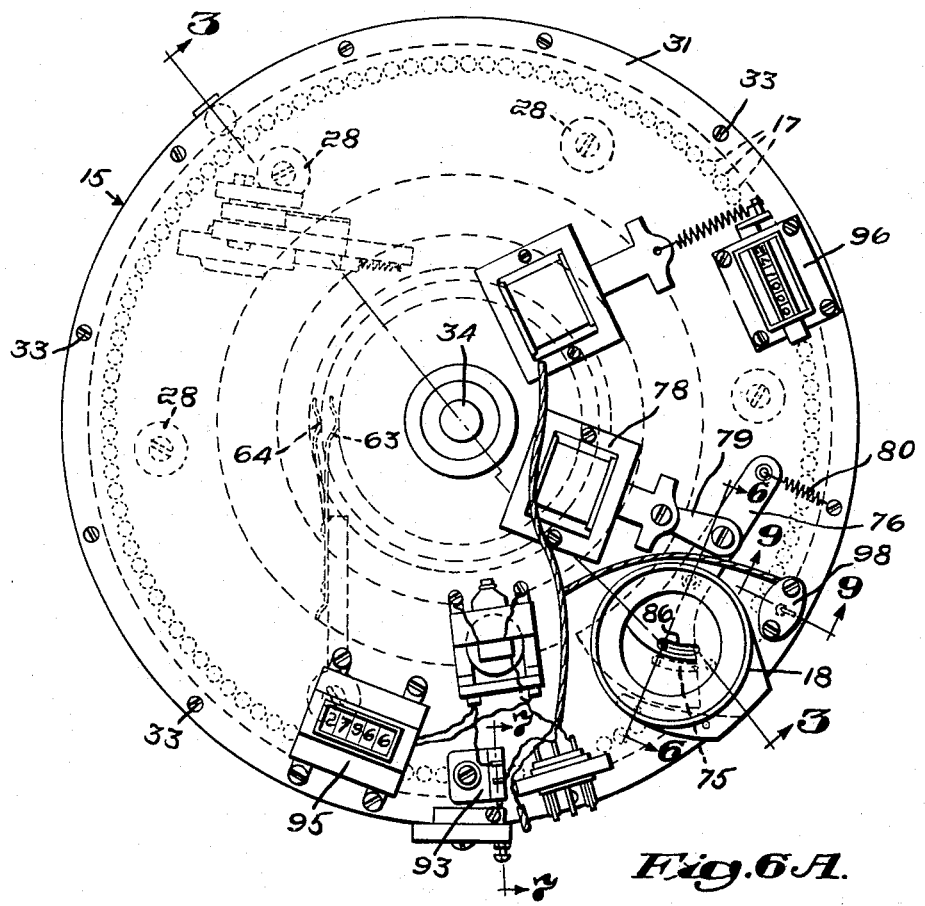
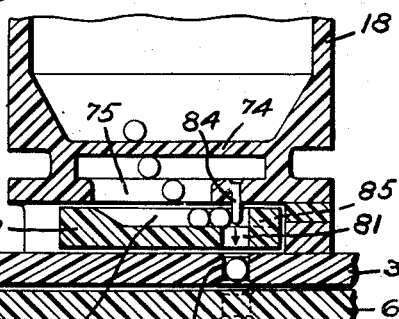
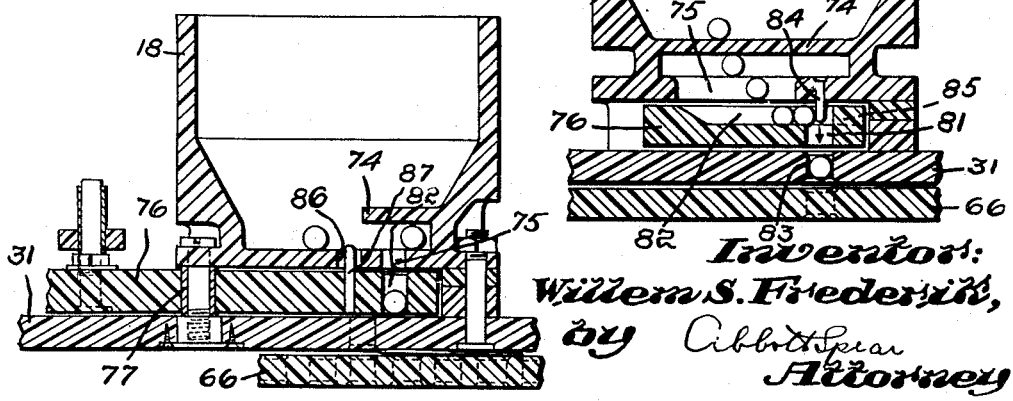

Inventor:
Willem S. Frederik,
by Abbott Spear
Attorney

March 1, 1955 W. S. FREDERIK 2,702,950
APPARATUS FOR TESTING TIME INTERVALS
Filed April 12, 1952 6 Sheets-Sheet 5

Inventor:
Willem S. Frederik,
by Abbott Green
Attorney

March 1, 1955    W. S. FREDERIK    2,702,950
APPARATUS FOR TESTING TIME INTERVALS
Filed April 12, 1952    6 Sheets-Sheet 6
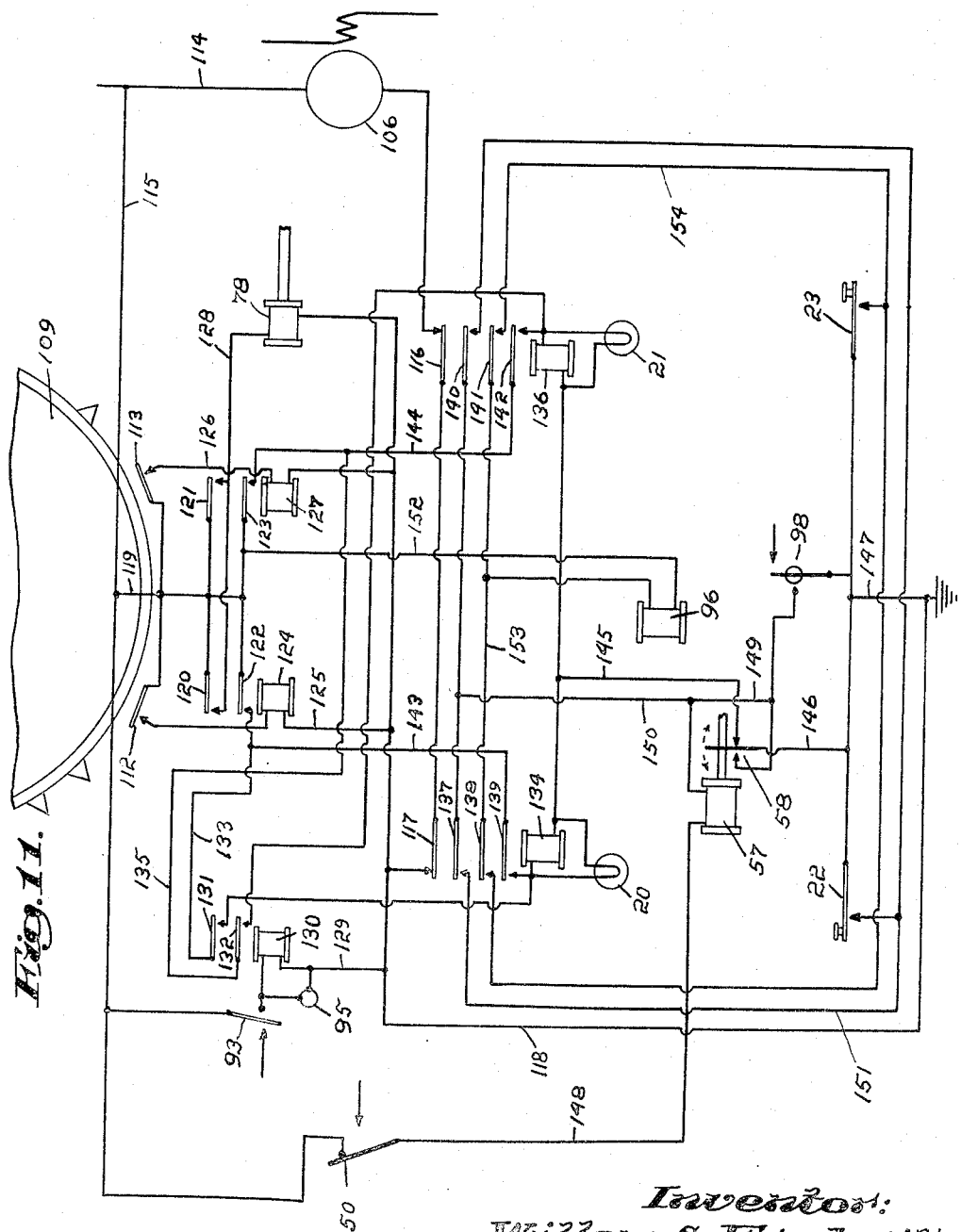
Inventor:
Willem S. Frederik,
by
Attorney

# United States Patent Office 2,702,950
Patented Mar. 1, 1955

2,702,950

APPARATUS FOR TESTING TIME INTERVALS

Willem Steven Frederik, West Roxbury, Mass.

Application April 12, 1952, Serial No. 282,071

14 Claims. (Cl. 35—22)

This invention relates to performance indicating apparatus for use in measuring reaction times in fatigue and like studies.

Fatigue studies are conducted for a variety of purposes and are, in general, laborious and time-consuming both to the subject and to the observer.

It has been noted that where, for example, two tasks are performed by the same person concurrently, performance deterioration on both tasks occurs at approximately the same time. This observation suggests the possibility of using one function as a performance indication for another function or functions.

Deterioration of performance, due to fatigue, of complicated and responsible activities, is extremely important but, in general, is not easy to measure. If, however, an extra job is added to the performance under study and that extra job has no significant influence on the magnitude of the original activity, an indication of the deterioration of the performance of the activities under study, can be secured as by measuring the reaction times required in carrying out the extra job.

The principal objective of this invention is to provide apparatus to record reaction times while the test subject is engaged in the activity or activities under study and this objective is accomplished by providing a support having a source for a supply of pellets, rotatable means to receive a pellet from the source, and a series of vertically disposed tubes arranged arcuately with respect to the axis of the means. Each tube represents a predetermined time interval in relation to the rotation of the means and a control is employed to start a pellet from its source travelling over the series of tubes and to operate a signal. The apparatus is also provided with means to be operated by the test subject in response to the signal, to effect the transfer of the pellet from the rotatable means to the subjacent tube. After a number of such tests, the pellets accumulated in the tubes give a graphic presentation of the frequency distribution of the reaction times of the test subject.

Figure 3:
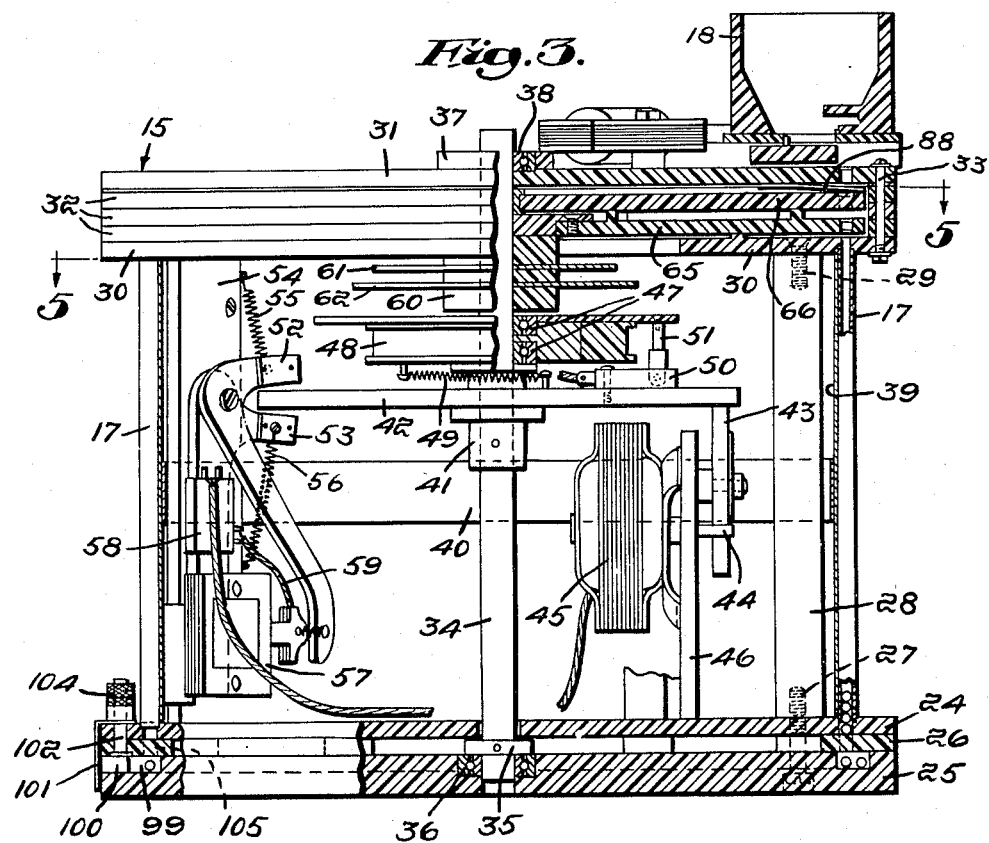
Figure 4:
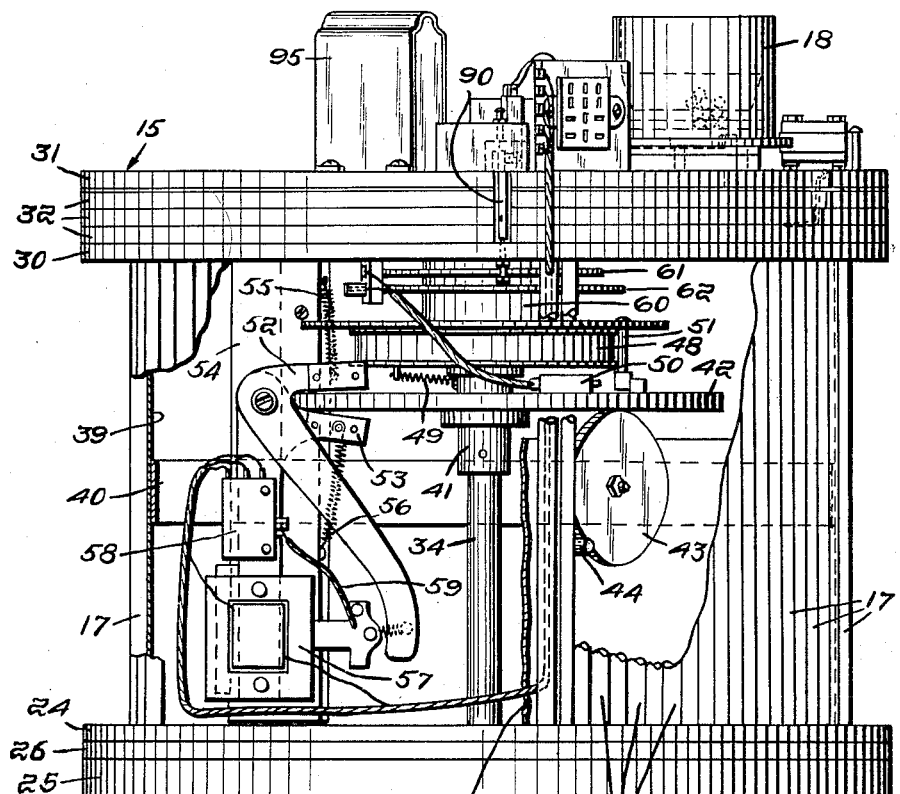
Figures 7, 8, 9:
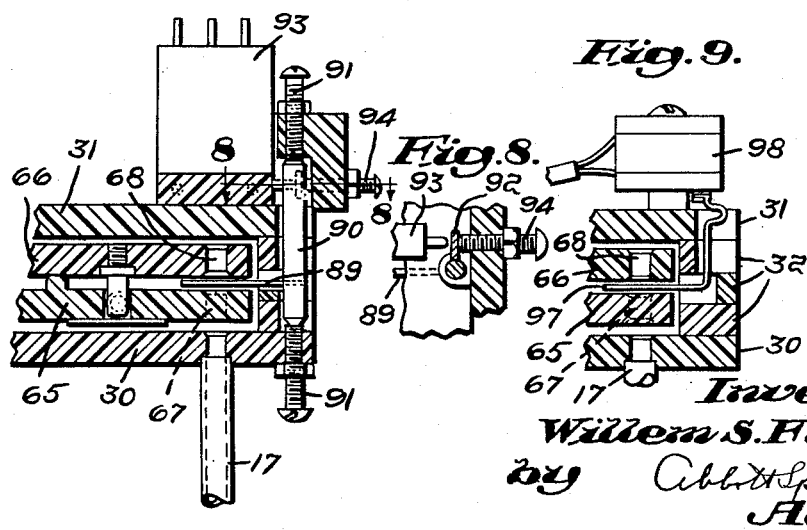
Figure 5:
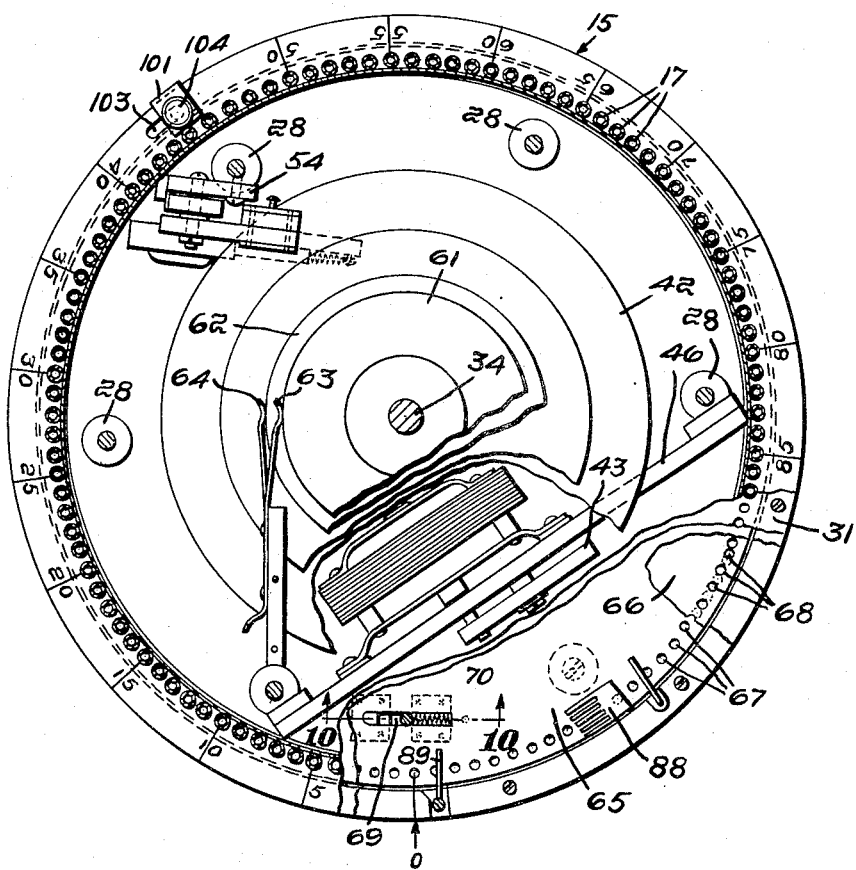
Figure 10:
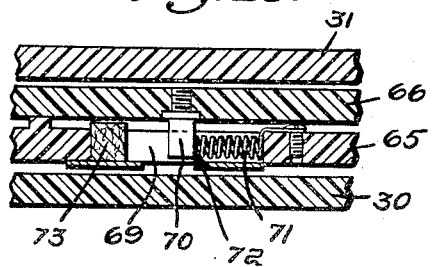

Other and more specific objectives of the invention relate to the incorporation, in such apparatus, of controls providing insurance against failure and incorrect recordings resulting from wrong reactions on the part of the subject or from his failure to react. These objectives will be apparent from a consideration of the illustrative embodiment of the invention shown in the drawings in which Fig. 1 is a perspective view of the apparatus with the control unit being partly broken away, Fig. 2 is a top plan view of the recording unit, Fig. 3 is a section of the recording unit taken along the indicated lines 3—3 of Fig. 2, Fig. 4 is a partly broken away side view of the apparatus, Fig. 5 is a section along the indicated lines 5—5 of Fig. 3, Figs. 6, 7, and 9 are fragmentary sections, on an enlarged scale, along the indicated lines 6—6, 7—7, and 9—9, respectively of Fig. 2, Fig. 6a is a fragmentary view, generally similar to Fig. 6, but with the arm swung into pellet dropping position, Fig. 8 is a fragmentary section taken along the lines 8—8 of Fig. 7, Fig. 10 is a fragmentary section taken along the indicated lines 10—10 of Fig. 5, and Fig. 11 is a diagrammatic view of the electric circuits.

Before detailing the apparatus shown in the drawings, reference is first made to Fig. 1 wherein the recording unit and the control unit are indicated generally at 15 and 16, respectively.

The recording unit 15 has an arcuately disposed series of vertical tubes 17 of transparent stock and a hopper 18 for pellets 19. By means, presently to be described, a pellet is released from the hopper and advanced along an arcuate pathway above the tubes. Each tube represents a predetermined interval of time, say ⅒₀ of a second, with reference to a "zero" point, identified at 0, and in relation to the rate of travel of a pellet along its pathway.

In practice, the control unit 16 is operative, at predetermined intervals, to initiate the test cycle of the apparatus by releasing a pellet from its source shown as a hopper 18 and when that pellet reaches the "zero" point of its pathway, the circuit is completed to whichever of the light bulbs 20 or 21 that has been preselected by the control unit 16. Switches 22 and 23 are associated, respectively, with the light bulbs 20 and 21 and when the appropriate switch is closed by the test subject, means are actuated by which the pellet is dropped from its pathway into the subjacent tube 17 to record his reaction time.

While each reaction time is accurately measured, after a series of tests, the pellets 19 that have accumulated in the tubes 17 graphically represent the frequency distribution of the reaction times recorded as suggested in Fig. 1.

In describing the recording unit 15, reference is first made to Fig. 3. The unit 15 has a base consisting of circular plates 24 and 25 spaced apart by the ring 26 but united by bolts 27 located interiorly of the ring 26 and threaded into the lower end of posts 28. Bolts 29 anchor a ring 30 to the upper ends of the posts 28. A cover 31 is spaced from the ring 30 as by spaces 32 through which extend the bolts 33 which interconnect the cover and ring 30.

The base plates 24 and 25 are centrally bored to receive the lower end of the shaft 34 which has an annular shoulder 35 located between them. The plate 24 is counterbored to accommodate the bearing unit 36. The cover 31 is centrally bored to receive the upper end of the shaft 34 and has a ring 37 to retain the bearing unit 38.

Adjacent their peripheries, the plate 24 and the ring 30 each have a series of vertically disposed holes that are disposed arcuately with respect to the axis of the shaft 34. Each hole of one series is in vertical alinement with the corresponding hole of the other series and the ends of the holes opening through the proximate faces of these parts are counterbored to receive the corresponding ends of the tubes 17. The tubes 17 are closely spaced but as they are of transparent stock the graph backing sheet 39 is visible therethrough. The sheet 39 is held in place by the band 40.

Fast on the shaft 34 is a hub 41 supporting the disc 42 frictionally engaged by the driving wheel 43 frictionally driven by the shaft 44 of the electric motor 45 which is mounted on a support 46 attached to two of the posts 28.

Above the disc 42 are bearing units 47 supporting the weighted wheel 48 for independent rotation. The wheel 48 and the disc 42 are yieldably interconnected by a spring 49 so that they may rotate together. The disc 42 supports a normally closed switch 50 adapted to be opened by engagement therewith of the arm 51 carried by the wheel 48 when disc 42 is held against rotation by engagement of the brake elements 52 and 53 with its opposite faces.

The brake elements 52 and 53, see Figs. 3 and 4, are pivotally connected to a support 54 attached to one of the posts 28 and are yieldably held in disengaged position by springs 55 and 56. Mounted on the lower part of the brake element 53 is a solenoid 57 having its plunger operatively connected to the lower part of the brake element 52. When the solenoid 57 is energized, the brake elements are clamped against opposite faces of the disc 42 to stop its rotation. As the drive for the disc 42 is a friction drive, slippage occurs when the brake is applied. At 58, there is a micro-switch having an operating connection 59 with the solenoid plunger. The function of the micro-switch 58 and its connection 59 will be apparent when the description of the electrical circuits is detailed.

The shaft 34 is also provided with a hub 60 insulating from each other discs 61 and 62 engageable, respectively, by resilient contact arms 63 and 64 (see Fig. 5) for the two leads to the switch 50. The hub 60 also has a disc 65 attached thereto and additionally supports a disc 66 located above the disc 65 for rotation independently thereof. (See Figs. 2–5.)

The discs 65 and 66 each have a series of holes 67 and 68 extending vertically therethrough and there are the same number of holes in each series as there are tubes 17. The path of these series of holes is above the tubes 17 but the discs 65 and 66 are yieldably held in such a relative position that the holes 67 of the disc 65 do not register with the holes 68 of the disc 66.

The result is accomplished, as may best be seen in Fig. 10, by providing the disc 65 with a slot 69 into which extends a stud 70 depending from the disc 66. Anchored in the slot 69 and connected to the stud 70 is a spring 71 yieldably holding the stud 70 against the stop 72 to effect a driving connection between the discs 65 and 66. When the brake is applied, the disc 65 stops but the momentum of the disc 66 causes it to continue until the resilient bumper 73 at the other end of the slot is engaged by the stud 70. During such partial rotation of the disc 66, each of its holes momentarily registers with a corresponding one of the holes of the disc 65.

By this arrangement, a pellet 19 may be confined in any one of the holes 68 of the rotating disc 66 and supported by the disc 65 as long as these discs rotate together and dropped through a hole 67 in the disc 65 and into the subjacent tube 17 when the rotation of the shaft 34 is stopped.

Pellets 19 are stored in the hopper 18 having a ledge 74 overlying the arcuate outlet slot 75 and spaced from the bottom of the hopper 18 by a distance slightly greater than the diameter of a pellet 19.

An arm 76 pivotally connected as at 77 to the cover 31 is connected to the plunger of the solenoid 78 by a link 79. When the solenoid 78 is energized, the arm 76 is swung from its slot-blocking position in which it is yieldably held by the spring 80. The arm 76 has a vertically disposed hole 81 and is sufficiently thick so that the hole is of a length to accommodate two pellets 19. The hole 81 is at one end of an arcuate groove 82 which is of a depth slightly in excess of the diameter of one pellet. Until the solenoid 78 is energized, balls may enter the arm groove 82 through the hopper slot 75 and enter the hole 81 but they are prevented from escaping by engagement with the upper surface of the cover 31. When the solenoid 78 is energized, escape of pellets from the hopper 18 is prevented by the arm 76 and the hole 81 is moved into registry with the hole 83 in the cover 31. The hole 83 is directly above the path of the holes 68 in the rotating disc 66.

As will be apparent from Fig. 6, the bottom of the hopper 18 is provided with a pin 84 entrant of the upper half of the hole 81 when the arm 76 is positioned to discharge a pellet thereby to prevent the delivery of more than one of them. The arm 76 is slotted as at 85 to accommodate pin 84 as the arm 76 is returned by the spring 80. In the bottom of the hopper 18 there is a second arcuate slot 86 which receives a pin 87 on the arm 76 which is of sufficient length to extend into the lower part of the hopper 18 to agitate the pellets 82 as the arm 76 is moved from one position to the other.

From the foregoing, the means by which a pellet 19 is discharged from the hopper 18 to travel along the pathway above the tubes 17 and the means by which a travelling pellet 19 is discharged into the subjacent tube 17 are apparent.

Before describing the operation of the apparatus, attention is directed to the fact that a pellet dropping onto the rotating disc 66 is likely to develop a spin and for that reason, there is provided a brush-like element 88 attached to the under surface of the cover 31 and engaging the proximate face of the disc 66 thereby to force any pellet tending to spin to enter the hole 68.

The shaft 34 rotates in a clockwise direction as viewed from its upper end. Adjacent the hopper 18, there is shown an arm 89 located between the discs 65 and 66 to be engaged by a pellet 19 supported thereby. (See Figs. 7 and 8.) The arm 89 is attached to a vertically disposed, double-ended pivot 90 engaged by adjustable bearings 91. The pivot 90 has an arm 92 engageable with the stem of the normally open micro-switch 93 supported on the cover 31. The arm 92 is backed by an adjustable stop 94. The point at which a pellet travelling along its pathway 21 engages the arm 89 as to close the switch 93 establishes the "zero" point of the recording apparatus 15.

The cover 31 also supports counters 95 and 96. The counter 95 is for pellets delivered to the "zero" point while the counter 96 is for those pellets that have not been released from the rotating discs 65 and 66, due, for example, to faulty response on the part of the test subject. Such pellets engage an arm 97 (see Fig. 9) extending between the discs 65 and 66 and operative to close the normally open micro-switch 98 also supported on the cover 31. The means operating these counters will be described in connection with the electrical circuits shown in Fig. 11.

After the test has been completed, it is, of course, necessary to empty the tubes 17 and return the pellets to the hopper 18. In order that such return may be conveniently effected, the base plate 25 is provided with a channel 99 in its upper surface and having a discharge port 100 closed by the gate 101 (see Figs. 3 and 5). The base ring 26 carries a stud 102 extending upwardly through an arcuate slot 103 in the base plate 24. The stud 102 supports the gate 101 and has a lock 104 threaded thereon. The base ring 26 is also provided with the same number of holes 105 as there are tubes 17 and when the gate 101 is positioned to close the discharge port 100, the holes 105 are disposed out of registry with the holes in the base plate 24 receiving the lower ends of the tubes 17. When, however, the lock 104 is released, the base ring 26 may be turned thus bringing each of its holes 105 into registry with the corresponding holes in the base plate 24 and unblocking the discharge port 100 thereby to enable the tubes 17 to be emptied.

The operation of the apparatus as thus far detailed will be apparent from a consideration of the control unit 16 shown in Fig. 1 and the electrical circuits shown in Fig. 11.

The control unit 16 has an electric motor 106, preferably synchronous, having a belted connection 107 with the vertically disposed shaft 108. The shaft 108 supports the disc 109 having a series of studs 110 on its upper surface and a series of studs 111 on its lower surface. As will be apparent from Fig. 1, the studs of each series are irregularly spaced with reference to each other and to the studs of the other series. As the disc 109 turns, the studs 110 successively engage and close the normally open switch 112 and the studs 111 successively engage and close the normally open switch 113.

With reference to Fig. 11, there are two circuit leads 114 and 115. The circuit lead 114 includes the motor 106, normally closed switches 116 and 117 which are arranged in series and with the switch 117 being connected to the grounded wire 118.

The second circuit lead 115 includes a lead 119 connecting it to the switches 112, 113, 120, 121, 122, and 123.

Rotation of the disc 109 causes the switches 112 and 113 to be closed in desired sequence and at desired intervals. As the electrical system is substantially the same for both of these switches, the discussion, as to operation, is limited, for the most part, to the closing of the switch 112.

When the switch 112 is closed, for example, the relay 124 in lead 125 is energized. A like lead 126, closed by switch 113, also includes a relay 127. Leads 125 and 126 are both connected to the ground wire 118. When the relay 124 is energized, the normally open switches 120 and 122 are both closed, and similarly, the normally open switches 121 and 123 are closed when the relay 127 is energized. When the switch 120 is thus closed, the circuit is completed through the lead 128 to the solenoid 78 thereby to actuate the mechanism by which a pellet 19 is released from the hopper 18.

When the released pellet 19 is carried by the discs 65 and 66 into engagement with the switch arm 89, the switch 93 is closed momentarily. The switch 93 thus controls the lead 129, including a relay 130 and the pellet counter 95 arranged in parallel therewith.

The relay 130 is adapted, when energized, to close the normally open switches 131 and 132. A lead 133 includes the switch 122, the switch 131, and a relay 134. A similar lead 135 to the relay 136 is closed by the relay 130 when the relay 127 has also been energized. The light 20 is in parallel with the relay 134 and the light 21 is in parallel with the relay 136.

As the switch 122 has already been closed by the relay 124 and the switch 131 is now closed by the relay 130, the relay 134 is energized to open the switch 117 thereby opening the circuit for the motor 106 and this is desirable in order that the interval between any two successive signals is not only dependent on motor speed and the spacing of the studs carried by the disc 109 but also on the reaction time. The stopping of the motor 106 also has the advantage that the engaged switch 112 or 113 is held closed until the reaction is recorded.

The relay 134 is also operative, when energized, to close normally open switches 137, 138, and 139. Normally open switches 140, 141 and 142 are also closed by relay 136 when it has been energized.

Since the stopping of the motor 106 results in the switch 112 being held closed mechanically, the lead 143 to the relay 134 is now closed by the switch 139 and now serves as a holding circuit. It will be obvious that the lead 144 can similarly serve as a holding circuit for the relay 136. The pellet now disengages from the arm 89 and the circuit to the relay 130 is again open.

Both relays 134 and 136 have a common lead 145 connected to the lead 146 by the normally closed switch 58 and to the ground wire 118 by the connection 147.

The circuit lead 115 includes a lead 148 in which is located the normally closed switch 50, the solenoid 57 and the branches 149 and 150. When the brake actuating solenoid 57 is energized, the switch 58 is actuated to disconnect the leads 145 and 146 and interconnects the branch 149 to the lead 146 to complete the circuit. The parallel, normally open switch 98 is also adapted, when closed, to connect the branch 149 to the ground wire 118. Otherwise, the branch 149 is open, but the branch 150 is completed to the lead 151 through the switch 137, when closed by the relay 134, and when the switch 22 is closed by the person being tested. When the solenoid 57 is actuated, the relay 134 is de-energized but the interconnected branch 149 and the lead 146 function as a holding circuit until the brake releasing switch 50 is opened. When the brake is engaged, the pellet is dropped into the subjacent tube 17.

Should the person being tested operate the switch 23 instead of the switch 22, for example, his error will be recorded. To accomplish this result, a lead 152 is provided for the counter 96 which is connected to the lead 153 in which are located the switches 138 and 141 to connect it to the lead 154 to the switch 23. As the switch 138 is closed, the circuit to the counter 96 is completed if the switch 23 is closed. When the switch 113 is closed, the functions of the leads 151 and 154 are reversed.

In the event that the person fails to react within the period during which the discs 65 and 66 have made a substantially complete revolution, affording the allotted interval for the reaction, two seconds, for example, the pellet travelling with the discs 65 and 66 engages the arm 97 to operate switch 98 thereby to connect the branch 149 to the ground lead 147. The brake actuating solenoid 57 is thus energized and the pellet is then dropped, preferably into the "zero" tube 17, by the circuit established by the lead 114, which is independent of the closing of the switches 112 and 113 or the energizing of any of the relays.

From the foregoing, it will be appreciated that apparatus in accordance with the invention enables time measurements to be accurately made and also records those measurements to present their frequency distribution graphically.

What I therefore claim and desire to secure by Letters Patent is:

1. In apparatus for recording reaction time intervals, a pellet source, means to establish a path for a pellet and to advance a pellet therealong at a predetermined rate, a series of pellet receiving tubes spaced along said path so that each represents a predetermined time interval relative to the rate of travel of a pellet, time controlled means operable at a predetermined interval to transfer a pellet from said source to said path, and means operable by a person whose reaction time is being recorded and effective to transfer a pellet from said path to the tube to which the travelling pellet is then proximate.

2. In apparatus for recording reaction time intervals, a pellet source, means to establish a path for a pellet and to advance a pellet therealong at a predetermined rate, a series of pellet receiving tubes spaced along said path so that each represents a predetermined time interval relative to the rate of travel of a pellet, time controlled means operable at a predetermined interval to transfer a pellet from said source to said path, means operable by a person whose reaction time is being recorded and effective to transfer a pellet from said path to the tube to which the travelling pellet is then proximate, and means rendering said last named means inoperative until a pellet is in a predetermined position on said path.

3. In apparatus for recording reaction time intervals, a pellet source, means to establish a path for a pellet and to advance a pellet therealong at a predetermined rate, a series of pellet receiving tubes spaced along said path so that each represents a predetermined time interval relative to the rate of travel of a pellet, time controlled means operable at a predetermined interval to transfer a pellet from said source to said path, means operable by a person whose reaction time is being recorded and effective to transfer a pellet from said path to the tube to which the travelling pellet is then proximate, a signal, and means to actuate said signal when a pellet is in a predetermined position on said path.

4. In apparatus for recording time intervals, a pellet source, means to establish a path for a pellet and to advance a pellet therealong at a predetermined rate, a series of pellet receiving tubes spaced along said path so that each represents a predetermined time interval relative to the rate of travel of a pellet, means including a control unit to transfer a pellet from said source to said path, a pair of signals, means responsive to said control unit to actuate either one of said signals when a pellet is in a predetermined position on said path, and means to transfer a pellet from said path to the tube to which the travelling pellet is then proximate and including a pair of operator controls one for each signal, said last named means being operable only by the operator control for the actuated signal.

5. In apparatus for recording time intervals, a pellet source, means to establish a path for a pellet and to advance a pellet therealong at a predetermined rate, a series of pellet receiving tubes spaced along said path so that each represents a predetermined time interval relative to the rate of travel of a pellet, means including a control unit to transfer a pellet from said source to said path, a pair of signals, means responsive to said control unit to actuate either one of said signals when a pellet is in a predetermined position on said path, means to transfer a pellet from said path to the tube to which the travelling pellet is then proximate and including a pair of operator controls one for each signal, said last named means being operable only by the operator control for the actuated signal, and means to operate said last named means automatically as said pellet approaches the end of the series of tubes.

6. In apparatus for recording time intervals, a pellet source, means to establish a path for a pellet and to advance a pellet therealong at a predetermined rate, a series of pellet receiving tubes spaced along said path so that each represents a predetermined time interval relative to the rate of travel of a pellet, means including a control unit to transfer a pellet from said source to said path, a pair of signals, means responsive to said control unit to actuate either one of said signals when a pellet is in a predetermined position on said path, means to transfer a pellet from said path to the tube to which the travelling pellet is then proximate and including a pair of operator controls one for each signal, said last named means being operable only by the operator control for the actuated signal, and first and second pellet counters, said first counter including a control operable by pellets transferred to the path and said second counter including a control operable in response to the operator control for the unactuated signal.

7. In apparatus for recording time intervals with a pellet, first and second coaxial discs, means to rotate said first disc in one direction, said second disc being rotatable independently of said first disc, each disc having a series of equally spaced, vertical holes extending therethrough, there being the same number of holes in each series and each series being spaced equally from the axis of rotation, a connection between said discs by which the discs are rotated together but with their holes circumferentially offset to enable a pellet to be supported in a hole in the second disc by the adjacent face of said first disc, brake means for said first disc, and said connection being yieldable to enable said second disc to turn under its own momentum to bring a hole in said first disc into registry with the hole in the second disc in which the pellet is located.

8. In apparatus for recording time intervals with a pellet, first and second coaxial discs, first and second coaxial members, means to rotate said first disc and said first member in one direction, said second disc and second member being rotatable independently of said first disc and first member, each disc having a series of equally spaced, vertical holes extending therethrough, there being the same number of holes in each series and each series being spaced equally from the axis of rotation, a connection between said discs by which the discs are rotated together but with their holes circumferentially offset to enable a pellet to be supported in a hole in the second disc by the adjacent face of said second disc, brake means for said first disc including a solenoid, an electric circuit for said solenoid including a manually operable switch, and a holding circuit for said solenoid including a normally closed switch carried by said second member, said connection being yieldable to enable said second disc to turn under its own momentum to bring a hole in said first disc into registry with the hole in the second disc in which the pellet is located, and a connection between said members by which the members are rotated together, said connection being yieldable to enable said second member to turn under its own momentum, and means carried by said second member to open said normally closed switch when it has turned to a predetermined extent.

9. In apparatus for recording time intervals with pellets, a base comprising top and bottom discs and an intermediate ring, means interconnecting said discs, a connection between said ring and said top disc enabling said disc to turn relative thereto between first and second positions, said bottom disc having a circular channel in its upper surface opening through its periphery, said top disc and said ring each having a series of holes extending vertically therethrough, there being the same number of holes in each series, a pellet receiving tube in each hole in said top disc, the ring holes in said first position being disposed out of registry with said disc holes and in said second position registering therewith to enable pellets in the tubes to drop into said channel.

10. In apparatus for recording time intervals with pellets, a base comprising top and bottom discs and an intermediate ring, means interconnecting said discs, a connection between said ring and said top disc enabling said disc to turn relative thereto between first and second positions, said bottom disc having a circular channel in its upper surface opening through its periphery, said top disc and said ring each having a series of holes extending vertically therethrough, there being the same number of holes in each series, a pellet receiving tube in each hole in said top disc, the ring holes in said first position being disposed out of registry with said disc holes and in said second position registering therewith to enable pellets in the tubes to drop into said channel, and a gate for said opening in said bottom disc movable with said ring.

11. In apparatus for recording time intervals with pellets, means to establish a circular path for a pellet, a series of pellet receiving tubes under said path with each representing a predetermined time interval relative to the rate of travel of a pellet, a pellet source, means including a loading solenoid to transfer a pellet from said source to said path, means to effect the transfer of a pellet from the path to a subjacent tube and including a braking solenoid, and a control circuit including said solenoids, a first pair of normally open switches, a pair of signals, one for each switch of said first pair, and a second pair of normally open switches, one for each signal, and a control unit to close said first pair of switches in predetermined order and at predetermined intervals, said circuit energizing the loading solenoid and a signal when either of the first pair of switches is closed, and said circuit energizing said braking solenoid only when the switch, of the second pair of switches, for the energized signal is closed.

12. In apparatus for recording time intervals with pellets, means to establish a circular path for a pellet, a series of pellet receiving tubes under said path with each representing a predetermined time interval relative to the rate of travel of a pellet, a pellet source, means including a loading solenoid to transfer a pellet from said source to said path, a path switch closed by a pellet at a predetermined point on said path, means to effect the transfer of a pellet from the path to a subjacent tube and including a braking solenoid, and a control circuit including said solenoids, said path switch, a first pair of normally open switches, a pair of signals, one for each switch of said first pair, and a second pair of normally open switches, one for each signal, and a control unit to close said first pair of switches in predetermined order and at predetermined intervals, said circuit energizing the loading solenoid and, when said path switch is closed, a signal when either of the first pair of switches is closed, and said circuit energizing said braking solenoid only when the switch of the second pair for the energized signal is closed.

13. In apparatus for recording time intervals with pellets, means to establish a circular path for a pellet, a series of pellet receiving tubes under said path with each representing a predetermined time interval relative to the rate of travel of a pellet, a pellet source, means including a loading solenoid to transfer a pellet from said source to said path, first and second switches spaced along said path to be closed by a pellet, means to effect the transfer of a pellet from the path to a subjacent tube and including a braking solenoid, and a control circuit including said solenoid, said path switches, a first pair of normally open switches, a pair of signals, one for each switch of said first pair, and a second pair of normally open switches, one for each signal, and a control unit to close said first pair of switches in predetermined order and at predetermined intervals, said circuit energizing the loading solenoid and, when said first path switch is closed, a signal when either of the first pair of switches is closed, and said circuit energizing said braking solenoid only when the switch of the second pair for the energized signal is closed, said circuit to said braking solenoid including a parallel lead thereto closed by said second path switch.

14. In apparatus for recording time intervals with pellets, means to establish a circular path for a pellet, a series of pellet receiving tubes under said path with each representing a predetermined time interval relative to the rate of travel of a pellet, a pellet source, means including a loading solenoid to transfer a pellet from said source to said path, a first switch in said path to be closed by a pellet, means to effect the transfer of a pellet from the path to a subjacent tube and including a braking solenoid, and a control circuit including said solenoids, said path switch, a first pair of normally open switches, a pair of signals, one for each switch of said first pair, and a second pair of normally open switches, one for each signal, and a control unit to close said first pair of switches in predetermined order and at predetermined intervals, said circuit energizing the loading solenoid and, when said path switch is closed, a signal when either of the first pair of switches is closed, and said circuit energizing said braking solenoid only when the switch of the second pair for the energized signal is closed, said circuit also including an error counter energized by the closing of the switch of the second pair for the unenergizing signal.

References Cited in the file of this patent

UNITED STATES PATENTS

| | | |
|---|---|---|
| 2,479,534 | Bergh | Aug. 16, 1949 |
| 2,510,658 | Rassmann | June 6, 1950 |
| 2,527,469 | Vernon et al. | Oct. 24, 1950 |
| 2,557,380 | Hickox | June 19, 1951 |
| 2,651,412 | Aller | Sept. 8, 1953 |